(12) United States Patent
Stucki et al.

(10) Patent No.: US 10,759,529 B2
(45) Date of Patent: Sep. 1, 2020

(54) ROTOR BLADE COUPLING DEVICE OF A ROTOR HEAD FOR A ROTORCRAFT

(71) Applicant: Kopter Group AG, Mollis (CH)

(72) Inventors: Martin Stucki, Pfäffikon (CH); Mario Caminada, Jona (CH); Patrick Reginald Moser, Horgen (CH); Riekert Leibbrandt, Pretoria (ZA)

(73) Assignee: Kopter Group AG, Mollis (CH)

( * ) Notice: Subject to any disclaimer, the term of this patent is extended or adjusted under 35 U.S.C. 154(b) by 788 days.

(21) Appl. No.: 15/349,273

(22) Filed: Nov. 11, 2016

(65) Prior Publication Data
US 2017/0129598 A1    May 11, 2017

(30) Foreign Application Priority Data

Nov. 11, 2015 (CH) ........................ 1639/15
Oct. 11, 2016 (CH) ........................ 1360/16

(51) Int. Cl.
*B64C 27/635* (2006.01)
*B64C 27/48* (2006.01)
(Continued)

(52) U.S. Cl.
CPC ............ *B64C 27/635* (2013.01); *B64C 27/48* (2013.01); *B64C 27/51* (2013.01); *B64C 2027/003* (2013.01)

(58) Field of Classification Search
CPC . B64C 27/635; B64C 27/51; B64C 2027/003; B64C 27/48
See application file for complete search history.

(56) References Cited

U.S. PATENT DOCUMENTS 3,842,945 A    10/1974   Potter
4,504,193 A *   3/1985   Mouille ................. B64C 27/32
                                                416/134 A
(Continued)

FOREIGN PATENT DOCUMENTS

CN    102 501 970 A    6/2012
EP      0 080 920      6/1983
FR      2 929 675     10/2009

OTHER PUBLICATIONS

European Search Report for EP16197094 dated Mar. 6, 2017 (European application related to this application).

*Primary Examiner* — Aaron R Eastman
*Assistant Examiner* — Adam W Brown
(74) *Attorney, Agent, or Firm* — Paul D. Bianco; Gary S. Winer; Fleit Intellectual Property Law (57) ABSTRACT

A rotor blade coupling device for coupling to a rotor mast having a rotor head centerpiece. The coupling device has at least three rotor blade mountings mounted on the rotor head centerpiece and accommodating at least three rotor blades lying in a rotor plane, and at least one connecting element between adjacent rotor blade mountings. The rotor blade mountings can carry out pivoting motions about a pivoting axis extending vertical to the rotor plane. The at least one connecting element is a damping device, and the rotor blade coupling device has a plate-shaped transfer element, which respectively crosses a rotor blade mounting and is coupled to at least one damping device. The rotor blade coupling device has a simplified design and ensures improved damping of lead-lag motions.

17 Claims, 8 Drawing Sheets

(51) Int. Cl.
*B64C 27/51* (2006.01)
*B64C 27/00* (2006.01)

(56) References Cited

U.S. PATENT DOCUMENTS

| | | | | |
|---|---|---|---|---|
| 4,549,850 | A * | 10/1985 | Vincent | B64C 27/51 416/107 |
| 4,915,585 | A * | 4/1990 | Guimbal | B64C 27/51 416/107 |
| 5,141,398 | A * | 8/1992 | Bietenhader | B64C 27/51 416/107 |
| 9,085,357 | B2 * | 7/2015 | Davis | B64C 27/32 |
| 2008/0159862 | A1 | 7/2008 | Beroul | |
| 2010/0215496 | A1 | 8/2010 | Nannoni et al. | |
| 2016/0059959 | A1 * | 3/2016 | Stucki | B64C 27/48 416/131 |

* cited by examiner

ROTOR BLADE COUPLING DEVICE OF A ROTOR HEAD FOR A ROTORCRAFT

TECHNICAL FIELD

The present disclosure describes a rotor blade coupling device of a rotor head for a rotorcraft such as, for example, a direct-lift machine or a helicopter.

The rotor blade coupling device according to the disclosure particularly deals with the flapping and pivoting motions occurring during the rotation of the rotor blades.

Rotor blade coupling devices usually comprise a revolute joint that extends vertical to the rotor plane, wherein the resistance of this revolute joint to an angular adjustment between individual rotor blade mountings and a respectively associated, lift-generating rotor blade is adjustable. A pivoting motion occurs in the horizontal rotor plane in dependence on the position of the respective rotor blade. This pivoting motion is respectively directed rearward, i.e. opposite to the rotational direction ("lag") of a rotor blade, or forward, i.e. in the rotational direction ("lead") of a rotor blade. The angular adjustment resistance is usually adjustable with the aid of hydraulic damping elements that respectively decelerate or dampen these so-called lead-lag motions. Hydraulic damping elements are particularly complicated with respect to their installation, inspection and maintenance. Such lead-lag motions are primarily caused by Coriolis forces and aerodynamic drag, wherein these lead-lag motions are also affected by centrifugal forces and inertial forces.

BACKGROUND

Rotor blade coupling devices are known, for example, from US 2008/0159862 A1, wherein a plurality of damping elements (that are resilient in the rotational direction of the rotating rotor blades) are provided as connecting elements between two respectively adjacent rotor blades and dampen the lead-lag motions.

Such damping elements between two respectively adjacent rotor blades, which are known from US 2008/0159862 A1, are usually also referred to as "interblade" dampers. The rotor blade coupling device with damping elements between two respectively adjacent rotor blades known from US 2008/0159862 A1 has a complex design. For example, an additional arrangement of two respective joints and connecting brackets is required in the transition areas between the individual damping elements and rotor blade mountings, wherein the maintenance effort for these additional components is particularly high. It was furthermore determined that two joints of this type, which are spaced apart from the blade pitch axis, can generate negative dynamic effects.

Other rotor blade coupling devices known from the prior art, which feature connecting elements in the crossing area of the rotor blade mountings, as well as damping means for damping the lead-lag motions, are described below.

US 2010/0215496 A1 discloses a rotor blade coupling device with a design similar to that of the rotor blade coupling device known from US 2008/0159862 A1.

The rotor blade coupling device known from US 2010/0215496 A1 comprises a damping device that is arranged in the region crossing the rotor blade mounting, wherein this damping device comprises an elastomer component. The damping effect is based on elastic twisting of the elastomer component. Rods consisting, in particular, of rigid material are arranged between the damping devices as connecting elements between the rotor blades.

The rotor blade coupling device known from US 2010/0215496 A1 is complicated with respect to its installation and maintenance.

U.S. Pat. No. 4,915,585 discloses another rotor blade coupling device with a plurality of rotor blades that are respectively arranged on a rotor blade mounting, as well as damping means for damping lead-lag motions. U.S. Pat. No. 4,915,585 also discloses damping devices in the form of connecting means between adjacent rotor blade mountings or so-called "interblade" dampers. According to a preferred variation, the rotor blade coupling device known from U.S. Pat. No. 4,915,585 also comprises V-shaped and rigidly designed lever elements that respectively cross the rotor blade mountings, wherein one lever arm of the lever element is connected to a damping element in an articulated fashion and the other lever arm is rigidly connected to a damping device.

SUMMARY

Some embodiments disclose a rotor blade coupling device that comprises a minimal number of joints, has a simplified design in comparison with rotor blade coupling devices known from the prior art and ensures improved damping of lead-lag motions.

According to the disclosure, a plate-shaped transfer element, which respectively crosses a rotor blade mounting, forms part of two adjacent damping devices and is directly and functionally connected to the two adjacent damping devices.

The combination of all crossing plate-shaped transfer elements and damping devices respectively forms a divided ring or ring arrangement. In the state of the inventive rotor blade coupling device, in which the divided ring is coupled to the rotor head, this divided ring does not produce a direct mechanical and rigid functional connection between the divided ring and the rotor mast such that the divided ring is in a manner of speaking mounted in a completely cardanic fashion.

The ring arrangement consisting of the entirety of crossing plate-shaped transfer elements and damping devices may essentially be realized circular or polygonal, particularly pentagonal.

In other words, the respective divided ring or ring arrangement of the inventive rotor blade coupling device represents a ring arrangement with flexible sections, in which the flexible sections are formed by the damping devices.

It was advantageously determined that particularly sound damping with respect to the so-called "regressive mode" concerning ground resonance is achieved with such a ring arrangement of the inventive rotor blade coupling device.

It was furthermore surprisingly determined that the ring arrangement of the inventive rotor blade coupling device reduces the effect of collective and cyclic flapping motions, which occur during the rotation of the rotor blades, on the damping devices in comparison with the lead-lag damping systems of known rotor blade coupling devices. In this context, it is furthermore advantageous that such flapping motions already are aerodynamically dampened to a considerable degree with the inventive rotor blade coupling device such that an additional and undesirable load on the components of the damping devices of the inventive rotor blade coupling device is reduced and the service life of the components of the damping devices is thereby prolonged.

According to a preferred enhancement, the plate-shaped transfer element crossing the rotor blade mounting is realized angular or segment-shaped with two arms, wherein two respective arms of two adjacent transfer elements are directly connected to one another by means of the damping device in the form of a plate damper. A sufficiently rigid design of the transfer elements crossing the rotor blade mounting can be achieved with a corresponding choice of the material and/or geometry, particularly the thickness of the transfer element. It is particularly preferred that the materials for achieving the required rigidity of the transfer elements consist of materials of the type conventionally used in the construction of aircraft such as aluminum, steel, titanium or their alloys or composite fiber materials, e.g. with carbon fibers and/or glass fibers.

Although it is preferred that the crossing plate-shaped transfer elements are realized integrally, it would also be conceivable that the crossing plate-shaped transfer elements consist of multiple parts. In the context of the present disclosure, however, an integral plate-shaped transfer element, as well as a plate-shaped transfer element consisting of multiple parts, is realized in the form of a structurally rigid element without articulated sections.

Since the transfer elements crossing the rotor blade mountings form in accordance with the disclosure an integral component of two adjacent damping devices and therefore are directly and functionally connected to these two adjacent damping devices, the forces acting upon a respective rotor blade can be directly distributed to two damping devices in an improved fashion such that damping of the lead-lag motions is likewise improved. According to the present disclosure, the term functional connection refers to the crossing transfer element being integrated into the damping device in such a way that a relative motion can take place between the crossing plate-shaped transfer element and the other components of the damping device. In the context of the present disclosure, a direct functional connection between the plate-shaped transfer element and the damping device should be interpreted in such a way that, in contrast to the rotor blade coupling device known from U.S. Pat. No. 4,915,585, no additional joints are arranged between the transfer element and the damping device.

In the context of the present disclosure, the inventive rotor blade coupling device can preferably be coupled to the rotor mast of a main rotor. However, it would alternatively also be conceivable that the inventive rotor blade coupling device is arranged on the tail rotor. The inventive rotor blade coupling device is furthermore suitable for use in manned and remotely piloted rotorcraft.

It is preferred that the inventive rotor blade coupling device respectively comprises an elastomeric spherical bearing element for a rotor blade mounting in order to allow pivoting motions and flapping motions. It is particularly preferred to realize and arrange the spherical bearing elements in the rotor blade coupling device in such a way that the at least three rotor blade mountings behave flexibly during the rotation in the rotational direction and the at least three rotor blade mountings can carry out pivoting motions relative to the rotor head centerpiece about a pivoting axis extending essentially vertical to the rotor plane in order to thereby allow "lead-lag" motions. The elastomeric spherical bearing element is furthermore realized in such a way that the elastomeric spherical bearing element behaves flexibly in the direction of the flapping motions. In addition, the elastomeric spherical bearing elements are designed for behaving flexibly with respect to "blade pitch" rotations. Among experts, thusly designed bearing elements are also known as so-called "laminated spherical thrust bearings."

The rotor head centerpiece preferably features at least two openings, wherein an elastomeric spherical bearing element is respectively arranged in each opening. It would alternatively also be conceivable to arrange a mechanical bearing element at this location instead of an elastomeric spherical bearing element.

Such elastomeric spherical bearing elements advantageously cause a transmission of the centrifugal load from a respective rotor blade mounting to the rotor mast. Such elastomeric spherical bearing elements particularly transmit the centrifugal force (under pressure) and allow flapping motions, pivoting motions and so-called rotational "blade pitch" motions. In the context of the present disclosure, the term "elastomer" refers to rubber preferably being used as material such that the spherical bearings elastically deform under tensile and compressive loads, but subsequently once again return to their original undeformed shape.

Other advantageous embodiments are also disclosed.

The crossing plate-shaped transfer elements are preferably mounted such that they can be tilted relative to the rotor blade mountings, for example, by means of a sliding bearing, particularly a spherical rocker bearing with an anti-friction layer, and/or by means of an elastomeric bearing, particularly a spherical rocker bearing with one or more elastomer layers. Such a rocker bearing allows unobstructed rotational motions between the rotor blade mountings and the transfer elements.

The damping device is preferably realized in the form of a plate damper, wherein it is particularly preferred that the plate damper comprises and at least sectionally accommodates at least two plate-shaped transfer elements, which are spaced apart from one another and respectively cross adjacent rotor blade mountings. In other words, it would be conceivable in the context of the present disclosure to realize the damping devices in the form of any type of plate dampers or any other "interblade" dampers such as, for example, hydraulic dampers that make it possible to accommodate the crossing plate-shaped transfer elements.

In a damping device that is realized in the form of a plate damper, the damping is in other words realized due to shearing of the active units of the plate damper in the form of elastomer plates. The elastomer plates preferably behave viscoelastic, i.e. elastic for the energy accumulation and viscous for the energy absorption and energy conversion (damping).

The elastomer plates of the plate damper preferably consist of rubber elements that contain, for example, natural rubber, silicone rubber, ethylene-propylene-diene rubber (EPDM), polyurethane, butyl rubber, urethane rubber, polyvinyl acetate, polyvinyl chloride and the like. A material with a loss factor of at least 0.1 is ideally chosen for the elastomer plates.

The plate-shaped transfer elements preferably contain materials in the form of metals, for example aluminum, steel or titanium, or composite fiber materials, e.g. with carbon fibers, Kevlar fibers, aramide fibers and/or glass fibers.

Since the plate-shaped transfer elements, which respectively cross a rotor blade mounting, are at least sectionally accommodated by the damping devices and in other words integrated into the damping devices, the crossing plate-shaped transfer elements insofar represent, according to the present disclosure, a component of two adjacent damping devices. Due to the integration of the plate-shaped transfer elements, which cross the rotor blade mountings, into two adjacent damping devices, the crossing plate-shaped transfer elements are directly and functionally connected to the two adjacent damping devices.

The rocker bearings are preferably realized more rigidly in the crossing region of the rotor blade mountings, particularly linear in the rotational direction of the rotor blades and/or along the blade pitch axis, than the damping devices in the form of plate dampers arranged between the rotor blade mountings. In the context of the disclosure, the rigidity of the damping device in the form of a plate damper refers to a rigidity that results from the choice of its components in combination with its geometry or shape and the realizable fastening of the components.

The damping device of the inventive rotor blade coupling device, which is realized in the form of a plate damper, preferably can be realized or is realized with a rigidity between 0.5 kN/mm and 10 kN/mm, particularly between 1 kN/mm and 4 kN/mm. In other words, the rigidity of the damping device in the form of a plate damper easily can be specifically adjusted for the respective application and, in particular, the resonant frequencies of the rotor are adjustable.

It is particularly preferred that the rocker bearings are realized at least three-times more rigidly, especially at least five-times more rigidly, particularly linear in the rotational direction of the rotor blades and/or along the blade pitch axis, than the damping devices in the form of plate dampers arranged between the rotor blade mountings. The higher the rigidity of the rocker bearing is realized in relation to the rigidity of the damping device, the lower the losses in the transfer of motions from the rotor blade mountings to the respective divided ring or ring arrangement of the inventive rotor blade coupling device.

Another aspect of the present disclosure concerns a rotor head that comprises an inventive rotor blade coupling device and is intended for being coupled to a rotor mast.

According to a preferred enhancement of the inventive rotor blade coupling device, the rocker bearings may be composed of a rocker bearing mounting bolt and a spherical rocker bearing ball element, wherein the rocker bearing mounting bolt is virtually analogous to the rotor blade mountings arranged radially outward such that it essentially extends in the direction of the blade pitch axis.

According to another preferred enhancement of the inventive rotor blade coupling device, the rocker bearings alternatively may be respectively recessed into a transfer element perpendicular to the ring plane of the respective divided ring or ring arrangement.

BRIEF DESCRIPTION OF THE DRAWINGS

A preferred exemplary embodiment is described in greater detail below with reference to the attached drawings. In these drawings.

DESCRIPTION

Figure 1:
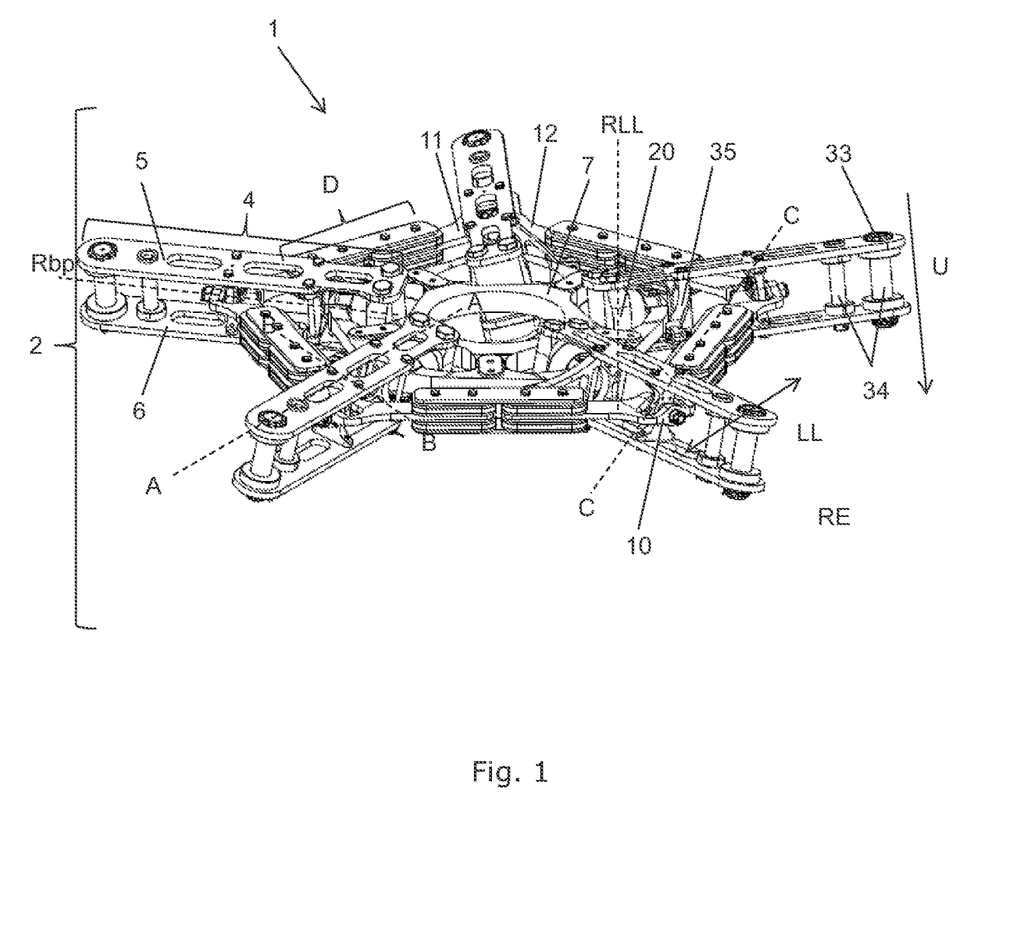
FIG. 1 shows a perspective view of a preferred embodiment of the inventive rotor blade coupling device.

FIG. 1 shows a perspective view of a preferred embodiment of the inventive rotor blade coupling device 2 of a rotor head 1. In this case, five not-shown rotor blades can be mounted on the rotor head 1 by means of the inventive rotor blade coupling device 2. The rotor blade coupling device 2 comprises a rotor head centerpiece 7, as well as five rotor blade mountings 4 that are mounted on the rotor head centerpiece and serve for accommodating five rotor blades. The rotor head centerpiece 7 is coupled to a rotor mast (that is not illustrated in FIG. 1) in a torsion-proof fashion, wherein the rotor mast can be set in rotation by means of a not-shown drive and the lifting force required for flying is generated during the rotation in a rotational direction U.

The rotor blade mountings 4 respectively comprise an upper rotor blade mounting plate 5 and a lower rotor blade mounting plate 6. In a radially outer region, the rotor blade mounting plates 5 and 6 feature openings 33 in order to accommodate elastically supported bolts 33 for fastening the rotor blades. FIG. 1 also shows a blade adjusting rod 35 that is coupled to a rotor blade mounting 4, wherein a coupled rotor blade mounting 4 is rotatable about a blade pitch axis Rbp (also referred to as "blade-pitch" axis) by means of the blade adjusting rod 35 such that the blade pitch angle of the rotor blade relative to the inflowing air can be adjusted and the rotorcraft ascends or descends (the so-called "blade pitch").

The rotor head centerpiece 7 illustrated in FIG. 1, which is realized in the form of a disk, is furthermore provided with openings 8, wherein an elastomeric spherical bearing element 20 is respectively arranged in the openings 8. The double arrow LL in FIG. 1 indicates that the elastic spherical bearing elements 20 respectively allow a three-dimensional pivoting motion LL about a pivoting axis RLL extending vertical to the rotor plane RE in connection with the described lead-lag motions, which occur in dependence on the alignment of a rotor blade 3. The pivoting motion LL in the rotor plane RE may take place in the rotational direction U ("lead") or opposite to the rotational direction U ("lag").

According to FIG. 1, the combination of all transfer elements 10 crossing the rotor blade mountings 4 and damping devices D respectively forms a divided ring or ring arrangement, wherein no direct mechanical connection exists between the divided ring and the rotor mast in the coupled state of the inventive rotor blade coupling device with the rotor head—as shown in FIG. 1—such that the divided ring is mounted in a completely cardanic fashion due to articulated connections between the upper and lower rotor blade mountings 5; 6.

Identical components are henceforth identified by the same reference symbols in the figures.

Figure 2:
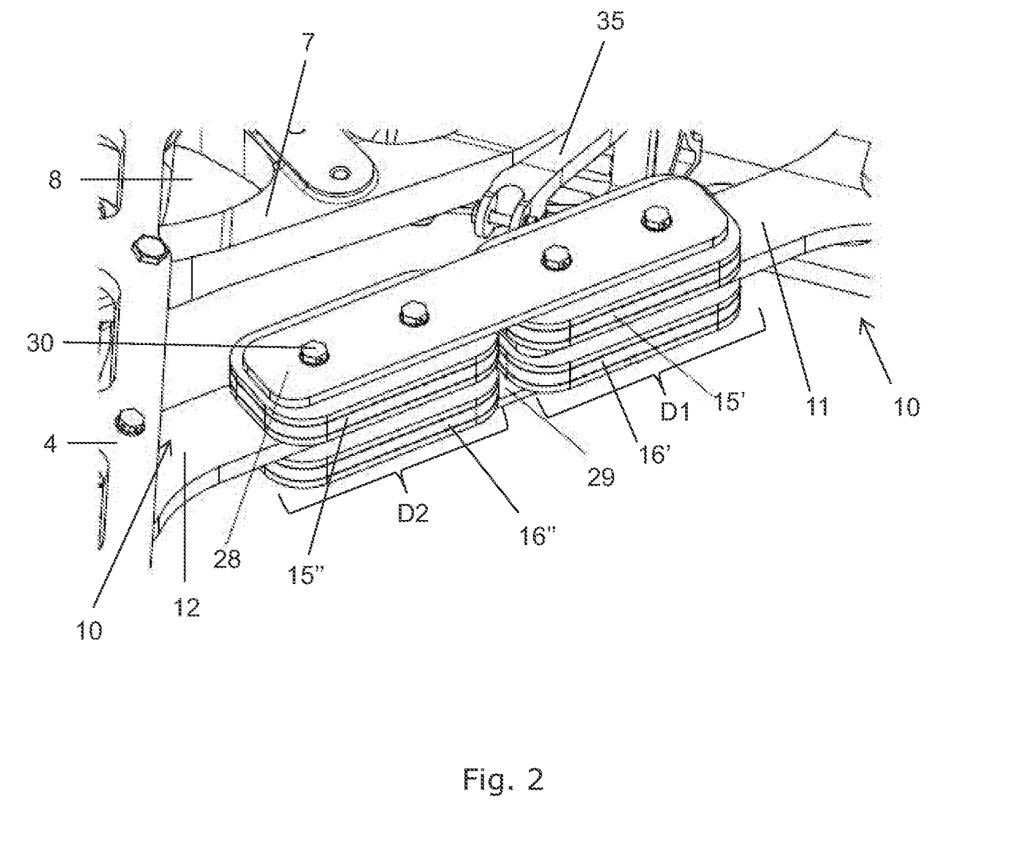
FIG. 2 shows a detail of the inventive rotor blade coupling device 2 with an enlarged view of a damping device D.

FIG. 2 shows a detail of the inventive rotor blade coupling device 2, namely an enlarged view of a damping device D that is arranged between two adjacent rotor blade mountings 4 as a so-called "interblade" damper and realized in the form of a plate damper.

An upper damping element 15' and a lower damping element 16' are arranged on a first arm 11 of a plate-shaped transfer element 10 forming a ring segment and thereby integrated into the damping device D in a functionally connected fashion in order to form a first damping section D1. In addition, an upper damping element 15" and a lower damping element 16" are arranged on a second arm 12 of an adjacent plate-shaped transfer element 10 of an adjacent rotor blade mounting 4 and thereby integrated into the damping device in a functionally connected fashion in order to form a second damping section D2. In this case, the articulated connection between the plate-shaped transfer elements 10 forming adjacent ring segments is advantageously shifted into the damping device.

FIG. 2 furthermore shows that the damping elements 15'; 15"; 16'; 16" respectively feature an elastomer plate 18 that is enclosed between two plates 17. The damping elements 15'; 15"; 16'; 16" may be fastened to one another by means of vulcanizing and/or bonding. The plates 17 may be made, for example, of metals such as steel, aluminum or titanium or of composite fiber materials.

The damping device D comprises an upper connecting plate 28 and a lower connecting plate 29, which produce a connection between the first damping section D1 and the second damping section D2. The connecting plates 28; 29 and the other components of the damping sections D1; D2 are fastened to one another by means of screws 30 and prestressed to a defined compression shift.

According to an alternative embodiment of the damping device D, it is conceivable that the damping elements 15'; 15" are rigidly connected to the upper connecting plate 28, for example by means of vulcanizing, in order to thereby form an upper unitary damping component, wherein a plate 17 can be advantageously eliminated on the side facing away from the arms 11; 12 (i.e. between the connecting plate 28 and the damping elements 15'; 15") in order to thereby reduce the weight. A lower unitary damping component can be analogously realized by rigidly connecting the damping elements 16'; 16" to the lower connecting plate 29. The upper and lower damping components with the arms 11; 12 are fastened to one another, for example, by means of threaded joints.

In the damping device D illustrated in FIG. 2, a relative motion between the first arm 11 of a transfer element and the other components in the first damping section D1 takes place due to shearing of the elastomer plates 18 of the damping elements 15'; 16' and a relative motion between the second arm 12 of an additional transfer element 10 and the other components in the second damping section D2 takes place due to shearing of the elastomer plates 18 of the damping elements 15"; 16" during the operation of the rotor head. Each damping element 15'; 15"; 16'; 16" is realized in a sandwich-like fashion and respectively consists of two plates 17 and an elastomer plate 18 arranged in between, wherein the plate-shaped transfer elements 10 respectively lie between two damping elements 15'; 15"; 16'; 16".

Figure 3:
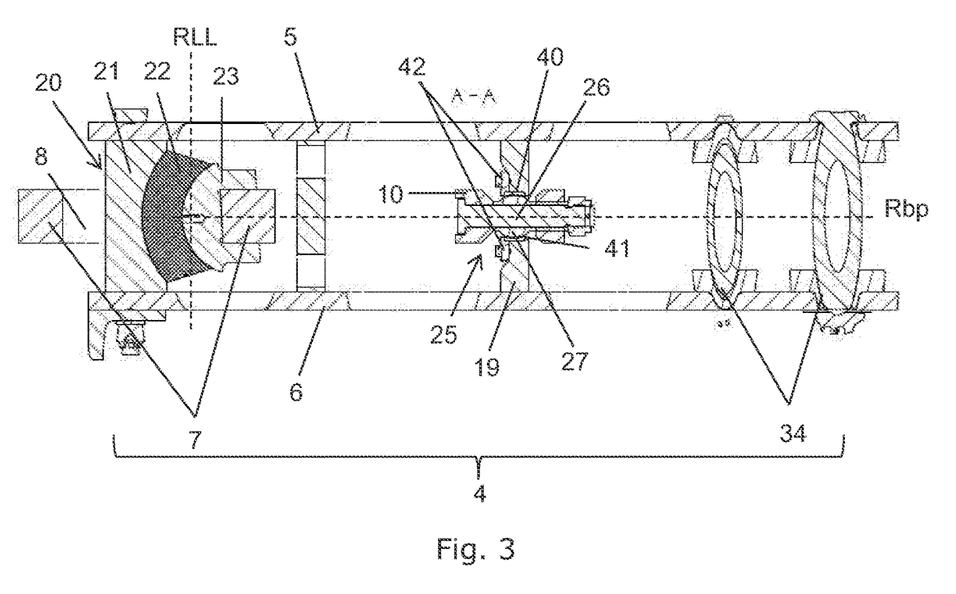
FIG. 3 shows a section through a rotor blade mounting of the inventive rotor blade coupling device along the line A-A in FIG. 1.

FIG. 3 furthermore shows a section through a rotor blade mounting 4 of the inventive rotor blade coupling device with an upper rotor blade mounting plate 5 and a lower rotor blade mounting plate 6 along the line A-A in FIG. 1. According to FIG. 3, a rocker bearing 25 consisting of a rocker bearing mounting bolt 26 and a spherical rocker bearing ball element 27 is arranged in the region of the transfer element 10, wherein the rocker bearing mounting bolt 26 is virtually analogous to the rotor blade mountings 4 arranged radially outward such that it essentially extends in the direction of the blade pitch axis Rbp, and wherein such an arrangement of the rocker bearing mounting bolt 26 proves particularly advantageous during the rotation of the blade pitch axis Rbp. The rocker bearing 25 furthermore comprises a rocker bearing housing 40 that has a spherical shape corresponding to the rocker bearing ball element 27 on the side facing the rocker bearing ball element 27. An anti-friction layer such as, for example, a Teflon layer or an elastomer layer 41 is arranged in the region between the rocker bearing housing 40 and the rocker bearing ball element 27. The rocker bearing 25 is arranged in a spacer 19 between the rotor blade mounting plates 5; 6 and fastened with the aid of fastening means 42. It is optionally also conceivable that the rocker bearing housing 40 and the spacer 19 are realized in the form of an integrated unitary component such that the installation and maintenance effort can be advantageously minimized.

An elastomeric spherical bearing element 20 is illustrated in an opening 8 of the rotor head centerpiece 7. The elastomeric spherical bearing element 20 comprises a shaped bearing component 21, a bearing component 22 realized in the form of a spherical segment and a bearing component 23 that sectionally accommodates the rotor head centerpiece 7. The bearing component 21 essentially is rigidly connected to the rotor blade mounting plates 5; 6. Furthermore, the bearing component 22 consists of a layered rubber/metal element, which allows pivoting, flapping and pitch angle adjustments due to its flexible design.

Figure 4:
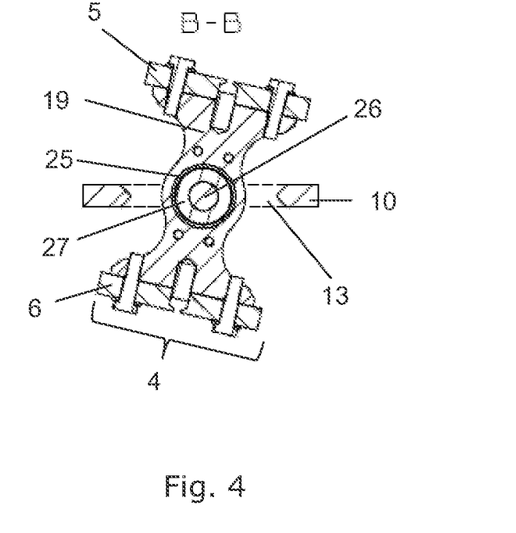
FIG. 4 shows a section between a rotor blade mounting, a rocker bearing and a transfer element of the inventive rotor blade coupling device along the line B-B in FIG. 1.

FIG. 4 shows a section between a rotor blade mounting 4, a rocker bearing 25 and a transfer element 10 of the inventive rotor blade coupling device 2 along the line B-B in FIG. 1, namely in the region of a recess 13 of the transfer element 10. According to FIG. 4, the rocker bearing 25 is arranged in a spacer 19 between the upper rotor blade mounting plate 5 and the lower rotor blade mounting plate 6 such that the transfer element 10 is in the context of the "blade pitch" adjustment mounted in a tiltable fashion relative to the rotor blade mounting 4. The rocker bearing 25 comprises a rocker bearing mounting bolt 26 that is surrounded by an outer rocker bearing ball element 27 such that the rocker bearing 25 is realized in the form of a spherical rocker bearing. The rocker bearing ball element 27 is preferably made of higher-strength metals such as, for example, steel or titanium or the like.

Figure 5:
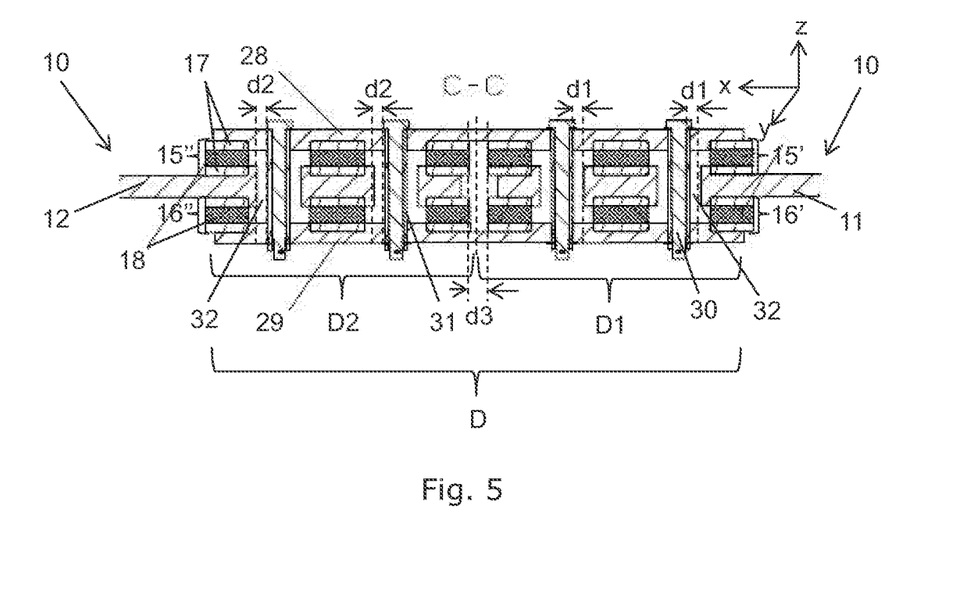
FIG. 5 shows a section through a damping device D of the inventive rotor blade coupling device in the form of a plate damper along the line C-C in FIG. 1.

FIG. 5 furthermore shows a section through a damping device D of the inventive rotor blade coupling device in the form of a plate damper along the line C-C in FIG. 1.

According to FIG. 5, the damping device D features four through-bores 32. A sleeve 31 is respectively arranged in each bore 32, wherein the prestress can be adjusted to a defined compression shift by choosing the length of the sleeve 32 accordingly. In other words, the components of the damping device D are adjusted to the defined compression shift in a shift-controlled fashion.

According to FIG. 5, damping elements 15'; 15"; 16'; 16", which respectively comprise an elastomer plate 18 enclosed between two plates 17, are sectionally arranged in a formfitting fashion in the connecting plates 28; 29, as well as in the arms 11; 12 on the opposite side. Due to such an arrangement of the damping elements 15'; 15"; 16'; 16", a relative motion, for example, of the arm 11 of the plate-shaped transfer element 10 relative to the other components, e.g. the connecting plates 28; 29 of the damping device D, in the direction x can be advantageously dampened.

A relative motion, for example, of the arm 11 of a plate-shaped transfer element 10 in the direction x, which is caused by the lead-lag motions of the rotor blade, is in other words dampened by means of shearing of the elastomer plate 18 of the damping elements 15'; 16' over a damping section D1. According to FIG. 5, clearances d1 (damping section D1) and d2 (damping section D2) respectively exist in the region, in which the screws 30 extend through the arms 11 and the arms 12, and the outside diameter of a respective sleeve 31, wherein these clearances d1; d2 define the maximum shift distances. Furthermore, an additional shift distance d3 is defined between the first arm 11 of a plate-shaped transfer element 10 and the second arm 12 of another plate-shaped transfer element 10, wherein this shift distance d3 ideally corresponds approximately to the sum of the shift distances d1+d2.

The plate-shaped transfer elements 10 and the arms 11; 12 are respectively able to absorb elastic thrust deformations in the x, y-direction due to the clearances d1 and d2, as well as certain deformations in the z-direction due to the elastic compressive deformability in the damping elements 15'; 16' and 15"; 16".

Figure 6:
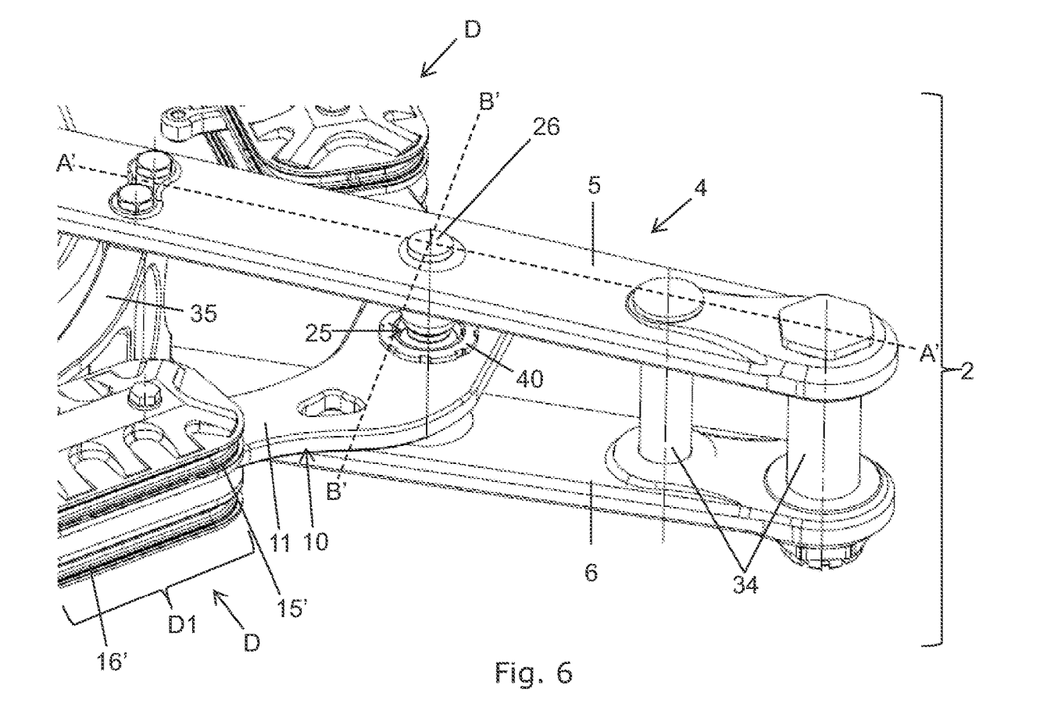
FIG. 6 shows a perspective view of an additional preferred embodiment of the inventive rotor blade coupling device.

FIG. 6 shows a perspective view of an additional preferred embodiment of the inventive rotor blade coupling device 2, in which the rocker bearing 25 is respectively recessed into a transfer element 10 perpendicular to the ring plane of the respective divided ring or ring arrangement.

An upper damping element 15' and a lower damping element 16' are arranged on a first arm 11 of a plate-shaped transfer element 10 forming a ring segment and thereby integrated into the damping device D in a functionally connected fashion in order to form a first damping section D1.

In this case, the rocker bearing 25 comprises a rocker bearing housing 40 that has a spherical shape corresponding to the rocker bearing ball element 27 on the side facing the rocker bearing ball element 27. The rocker bearing housing 40 is accommodated and mounted in a recess of the plate-shaped transfer element 10 in this case. An anti-friction layer, for example a Teflon layer, or an anti-friction layer of aluminum bronze or suitable plastics or an elastomer layer 41 is arranged in the region between the rocker bearing housing 40 and the rocker bearing ball element 27, wherein said layers may be connected to hardened and polished steel, ceramics or tungsten carbide.

In this embodiment, the rocker bearing mounting bolt 26 essentially extends between the upper rotor blade mounting plate 5 and the lower rotor blade mounting plate 6 of the rotor blade mounting 4.

Figure 7A:
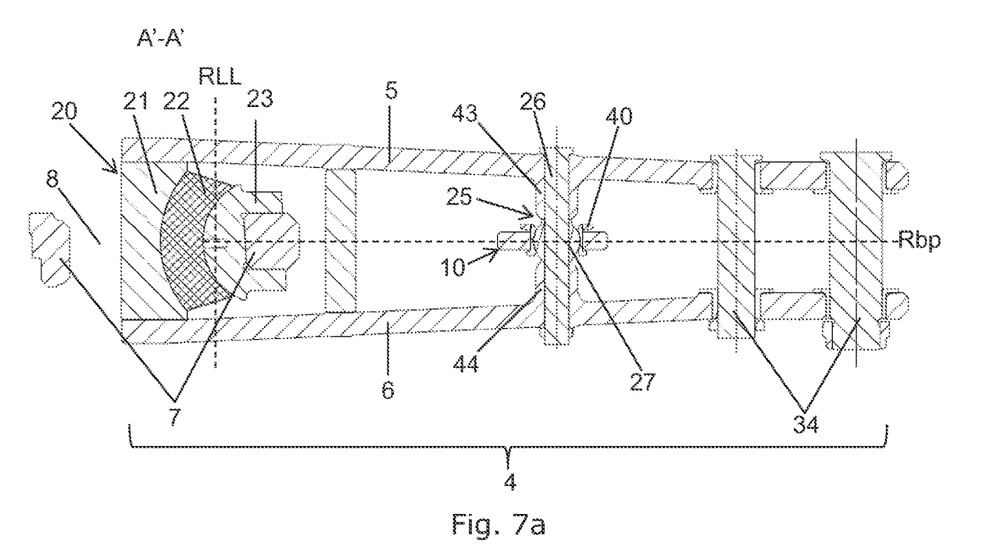
FIG. 7a shows a longitudinal section through a rotor blade mounting of the additional preferred embodiment of the inventive rotor blade coupling device along the line A'-A' in FIG. 6.

FIG. 7a shows a longitudinal section through a rotor blade mounting 4 of the inventive rotor blade coupling device along the line A'-A' in FIG. 6.

In this case, the rotor head centerpiece 7 features openings 8, wherein an elastomeric spherical bearing element 20 is respectively arranged in the openings 8. The bearing element 20 comprises a shaped bearing component 21, a bearing component 22 realized in the form of a spherical segment and a bearing component 23 that sectionally accommodates the rotor head centerpiece 7.

The rocker bearing 25 comprises a rocker bearing mounting bolt 26 that is surrounded by an outer rocker bearing ball element 27 such that the rocker bearing 25 is realized in the form of a spherical rocker bearing. According to FIG. 7a, the rocker bearing mounting bolt 26 extending between the upper rotor blade mounting plate 5 and the lower rotor blade mounting plate 6 is accommodated in an upper guide cylinder 43 and a lower guide cylinder 44, wherein the upper guide cylinder 43 is formed integrally on the upper rotor blade mounting plate 5 and the lower guide cylinder 44 is formed integrally on the lower rotor blade mounting plate 6 in this case. It is alternatively also conceivable that the guide cylinders 43; 44 are realized in the form of independent components and fastened on the rotor blade mounting plates 5; 6.

According to FIG. 7a, the rocker bearing 25 consisting of a rocker bearing mounting bolt 26 and a spherical rocker bearing ball element 27 is arranged in the region of the transfer element 10, wherein the rocker bearing mounting bolt 26 is respectively arranged or aligned perpendicular to the ring plane and perpendicular to the pitch angle axis Rbp in the idle state or inactive state of the rotor. In addition, the rocker bearing mounting bolt 26 is arranged such that it extends parallel to a longitudinal axis of the bolts 34 in this case.

Figure 7B:
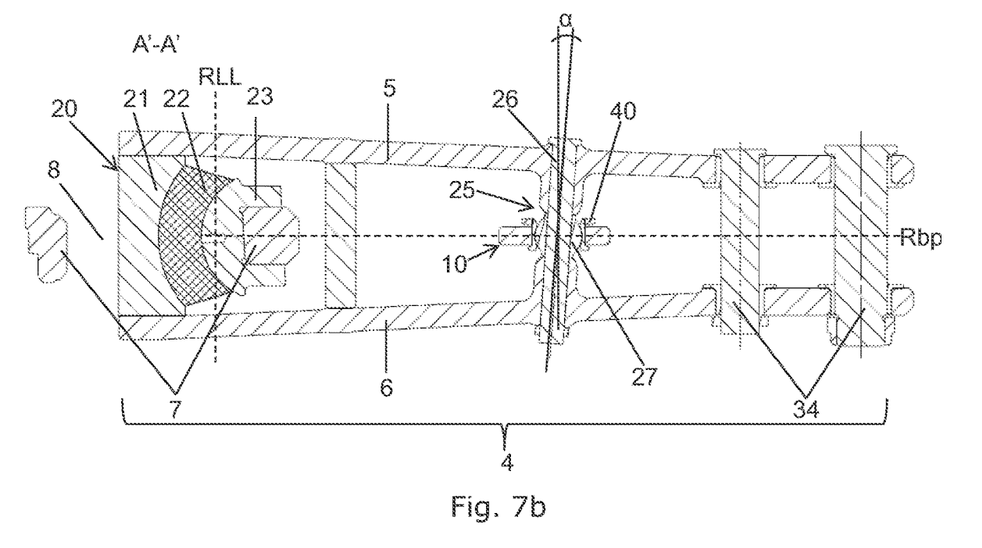
FIG. 7b shows a longitudinal section through a rotor blade mounting of the additional preferred embodiment of the inventive rotor blade coupling device, in which the rocker bearing mounting bolt is radially deflected, along the line A'-A' FIG. 6.

In this context, FIG. 7b shows the rotor blade coupling device 2 in the operating state of the rotor with rotating rotor blades, wherein the rocker bearing mounting bolt 26 can be respectively tilted or deflected by a tilting angle á of preferably up to 20°, particularly up to 1° to 5°.

As an example, FIG. 7b shows a rocker bearing mounting bolt 26 that is deflected radially outward in the direction of the blade pitch axis Rbp by a tilting angle á.

Figure 8A:
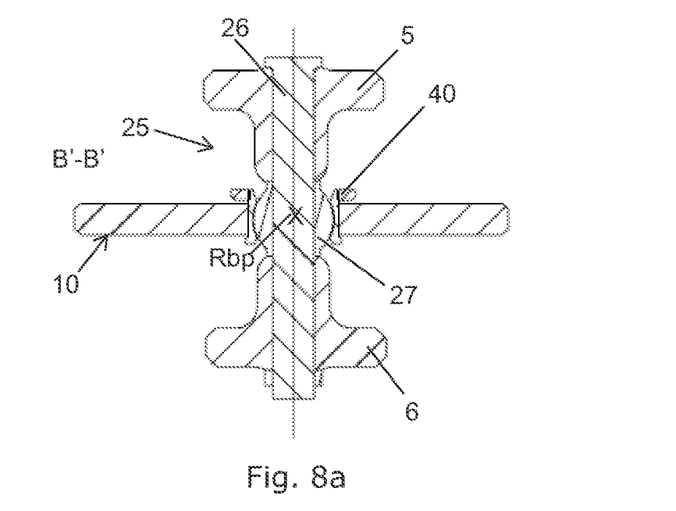
FIG. 8a shows a cross section through a rotor blade mounting of the additional preferred embodiment of the inventive rotor blade coupling device along the line B'-B' in FIG. 6.

FIG. 8a furthermore shows a cross section through a rotor blade mounting of the additional preferred embodiment of the inventive rotor blade coupling device along the line B'-B' in FIG. 6.

In this case, the rocker bearing mounting bolt 26 is respectively arranged or aligned perpendicular to the ring plane in the idle state or inactive state of the rotor.

Figure 8B:
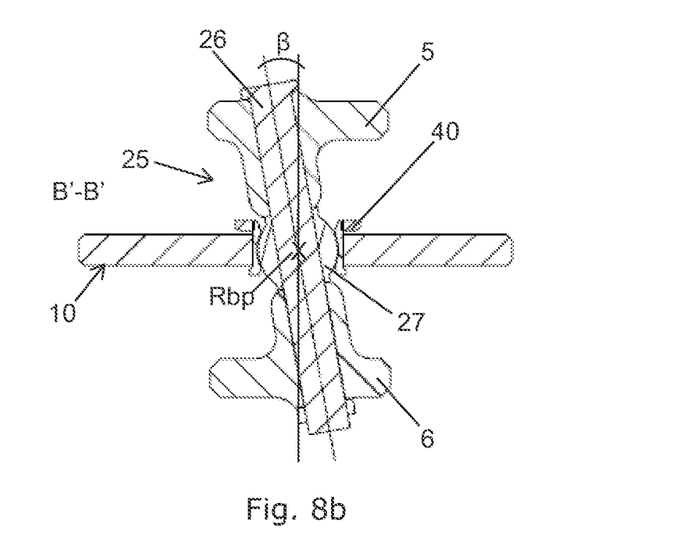
FIG. 8b shows a cross section through a rotor blade mounting of the inventive rotor blade coupling device, in which the rocker bearing mounting bolt is deflected in the rotational direction, along the line B'-B' in FIG. 6.

As an example, FIG. 8b shows a rocker bearing mounting bolt 26 that is deflected in the rotational direction of the rotating rotor blades. In this case, the rocker bearing mounting bolt 26 also can be respectively tilted or deflected about the pitch angle axis Rbp in this direction by a tilting angle á of preferably up to 20°, particularly up to 5° to 15°.

Due to the design of the rocker bearing 25 in the form of a spherical rocker bearing, the rocker bearing mounting bolt 26 can be respectively tilted or deflected by the tilting angles á and â about all axes, i.e. in any intermediate positions or superpositions of the deflections illustrated in FIGS. 7b and 8b.

Such an arrangement and alignment of the rocker bearing mounting bolt 26 of the rocker bearing 25, which is realized in the form of a spherical rocker bearing (as illustrated in FIGS. 6-8b), advantageously ensures particularly sound freedom of motion and avoidance of collisions. The deflections or tilting motions of the rocker bearing mounting bolt 26 are typically induced by the "blade pitch" about a blade pitch axis Rbp, by pivoting motions about the pivoting axis RLL, as well as by flapping motions (also referred to as "flapping").

LIST OF REFERENCE SYMBOLS

1 Rotor head
2 Rotor blade coupling device

4 Rotor blade mounting
5 Upper rotor blade mounting plate
6 Lower rotor blade mounting plate
7 Rotor head centerpiece
8 Opening
10 Transfer element
11 First arm
12 Second arm
13 Recess
15'; 15" Upper damping element (of plate damper)
16'; 16" Lower damping element (of plate damper)
17 Plate (damping element)
18 Elastomer plate (damping element)
19 Spacer
20 Elastomeric spherical bearing element
21 Bearing component
22 Bearing component
23 Bearing component
25 Rocker bearing
26 Rocker bearing mounting bolt
27 Rocker bearing ball element
28 Upper connecting plate
29 Lower connecting plate
30 Screw (of plate damper)
31 Sleeve (of plate damper)
32 Bore (of transfer elements)
33 Openings (of rotor blade mountings)
34 Bolts (of rotor blade mountings)
35 Blade adjusting lever
40 Rocker bearing housing
41 Anti-friction layer/elastomer layer (of rocker bearing)
42 Fastening means
43 Upper guide cylinder
44 Lower guide cylinder
á Tilting angle
D Dampening device
LL Pivoting motion (lead-lag)
RE Rotor plane
RLL Pivoting axis
Rbp Blade pitch axis
U Rotational direction (of rotor blades)

The invention claimed is:

1. A rotor blade coupling device configured for coupling to a rotor mast to form a rotor head for a rotorcraft, the rotor blade coupling device comprising:
 a rotor head centerpiece;
 at least three rotor blade mountings mounted on the rotor head centerpiece and configured for accommodating at least three rotor blades lying in a rotor plane, each of the at least three rotor blade mountings configured for pivoting motion about a pivoting axis extending vertical to the rotor plane;
 at least one connecting element between adjacent rotor blade mountings, the at least one connecting element formed as a damping device; and
 a transfer element crossing a rotor blade mounting and configured for coupling to at least one damping device, the transfer element at least sectionally accommodated by the damping device,
 wherein the transfer element is configured and arranged to directly and functionally connect with two adjacent damping devices through coupling with each of the two adjacent damping devices and forming an integrated part of the two adjacent damping devices,
 wherein the transfer element is tiltablely mounted relative to the rotor blade mountings by rocker bearings,
 wherein the damping device is a plate damper configured and arranged to accommodate at least two transfer elements, the at least two transfer elements spaced apart and crossing adjacent rotor blade mountings, and
 wherein the rocker bearings are more rigid in a crossing region of the rotor blade mountings than the plate dampers arranged between the rotor blade mountings.

2. The rotor blade coupling device according to claim 1, wherein the rocker bearings are more rigid linearly in a rotational direction of the rotor blades or are more rigid along a rotor blade pitch axis.

3. The rotor blade coupling device according to claim 1, wherein the plate damper has a rigidity between 0.5 kN/mm and 10 kN/mm.

4. The rotor blade coupling device according to claim 1, wherein the plate damper has a rigidity between 1 kN/mm and 4 kN/mm.

5. The rotor blade coupling device according to claim 1, wherein the rocker bearings are at least three times more rigid in a crossing region of the rotor blade mountings than the plate dampers arranged between the rotor blade mountings.

6. The rotor blade coupling device according to claim 5, wherein the rocker bearings are at least three times more rigid linearly in a rotational direction of the rotor blades or are more rigid along a rotor blade pitch axis.

7. The rotor blade coupling device according to claim 1, wherein the rocker bearings are at least five times more rigid in a crossing region of the rotor blade mountings than the plate dampers arranged between the rotor blade mountings.

8. The rotor blade coupling device according to claim 7, wherein the rocker bearings are at least five times more rigid linearly in a rotational direction of the rotor blades or are more rigid along a rotor blade pitch axis.

9. A rotor head comprising a rotor blade coupling device according to claim 1.

10. A rotor blade coupling device configured for coupling to a rotor mast to form a rotor head for a rotorcraft, the rotor blade coupling device comprising:
 a rotor head centerpiece;
 at least three rotor blade mountings mounted on the rotor head centerpiece and configured for accommodating at least three rotor blades lying in a rotor plane, each of the at least three rotor blade mountings configured for pivoting motion about a pivoting axis extending vertical to the rotor plane;
 at least one connecting element between adjacent rotor blade mountings, the at least one connecting element formed as a plate damper; and
 a transfer element crossing a rotor blade mounting and configured for coupling to at least one plate damper, the transfer element mounted by a rocker bearing and at least sectionally accommodated by the plate damper;
 wherein the transfer element is configured and arranged to directly and functionally connect with two adjacent plate dampers through coupling with each of the two adjacent plate dampers and forming an integrated part of the two adjacent plate dampers; and
 wherein the rocker bearings are more rigid in a crossing region of the rotor blade mountings than the plate dampers arranged between the rotor blade mountings.

11. The rotor blade coupling device according to claim 10, wherein the rotorcraft is a direct-lift machine or a helicopter.

12. The rotor blade coupling device according to claim 10, wherein the rocker bearing is a spherical rocker bearing having at least one elastomer layer.

13. The rotor blade coupling device according to claim 10, wherein the rocker bearings are more rigid linearly in a rotational direction of the rotor blades or are more rigid along a rotor blade pitch axis.

14. The rotor blade coupling device according to claim 10, wherein the plate damper has a rigidity between 1 kN/mm and 4 kN/mm.

15. The rotor blade coupling device according to claim 10, wherein the rocker bearings are at least three times more rigid in a crossing region of the rotor blade mountings than the plate dampers arranged between the rotor blade mountings.

16. The rotor blade coupling device according to claim 15, wherein the rocker bearings are at least three times more rigid linearly in a rotational direction of the rotor blades or are more rigid along a rotor blade pitch axis.

17. A rotor head comprising a rotor blade coupling device according to claim 10.

\* \* \* \* \*